United States Patent
Natsuda et al.

(10) Patent No.: US 11,383,313 B2
(45) Date of Patent: Jul. 12, 2022

(54) MACHINE TOOL AND GEAR MACHINING METHOD

(71) Applicant: JTEKT Corporation, Osaka (JP)

(72) Inventors: Kazuki Natsuda, Kitanagoya (JP); Kento Takeuchi, Kariya (JP); Hisashi Otani, Anjo (JP); Hiroyuki Nakano, Tokai (JP)

(73) Assignee: JTEKT Corporation, Osaka (JP)

(*) Notice: Subject to any disclaimer, the term of this patent is extended or adjusted under 35 U.S.C. 154(b) by 96 days.

(21) Appl. No.: 16/667,968

(22) Filed: Oct. 30, 2019

(65) Prior Publication Data

US 2020/0130120 A1  Apr. 30, 2020

(30) Foreign Application Priority Data

Oct. 30, 2018  (JP) ............................. JP2018-203841

(51) Int. Cl.
*B23Q 3/157*  (2006.01)
*B23Q 17/22*  (2006.01)
(Continued)

(52) U.S. Cl.
CPC ............ *B23F 17/006* (2013.01); *B23F 5/163* (2013.01); *B23F 5/22* (2013.01); *B23F 19/104* (2013.01);
(Continued)

(58) Field of Classification Search
CPC ...... B23F 19/06; B23F 19/007; B23F 19/102; B23F 5/163; B23F 23/1218;
(Continued)

(56) References Cited

U.S. PATENT DOCUMENTS

| | | | | |
|---|---|---|---|---|
| 4,942,657 A | * | 7/1990 | Mihara | B23F 23/1281 409/231 |
| 6,079,090 A | * | 6/2000 | Ongaro | B23F 17/006 29/270 |

(Continued)

FOREIGN PATENT DOCUMENTS

| | | |
|---|---|---|
| DE | 19918289 A1 | * 10/2000 |
| DE | 10305752 A1 | * 10/2004 |

(Continued)

OTHER PUBLICATIONS

Machine Translation of JP 2000-141129-A, which JP '129 was published May 2000.*

(Continued)

*Primary Examiner* — Erica E Cadugan
(74) *Attorney, Agent, or Firm* — Oblon, McClelland, Maier & Neustadt, L.L.P.

(57) ABSTRACT

A machine tool includes a workpiece holder, a tool holder holding working tools that includes a hob cutter used in a rough machining and a skiving cutter used in a finish machining, a tool magazine, a tool replacing device replacing one of the working tools mounted on the tool holder with the other of working tools housed in the tool magazine, a rough machining controlling section performing the rough machining on the workpiece, a tool measuring device measuring a position of a blade in a rotation direction of the skiving cutter, an angle correcting section correcting a rotation angle of the skiving cutter based on a result measured by the tool measuring device, and placing a tooth space formed in the workpiece and an edge tip of the blade in a position corresponding to each other, and a finish machining controlling section by which workpiece is finish machined.

8 Claims, 8 Drawing Sheets

(51) Int. Cl.
  *B23F 5/22* (2006.01)
  *B23F 5/16* (2006.01)
  *B23F 23/12* (2006.01)
  *B23F 17/00* (2006.01)
  *B23Q 3/155* (2006.01)
  *B23F 19/10* (2006.01)
  *B23Q 11/08* (2006.01)

(52) U.S. Cl.
  CPC ........ *B23F 23/1218* (2013.01); *B23Q 3/1554* (2013.01); *B23Q 3/15526* (2013.01); *B23Q 3/15766* (2013.01); *B23Q 17/2233* (2013.01); *B23Q 11/0825* (2013.01); *B23Q 2003/155418* (2016.11); *B23Q 2003/155428* (2016.11); *B23Q 2003/155446* (2016.11); *B23Q 2230/002* (2013.01); *Y10T 409/100159* (2015.01); *Y10T 409/102226* (2015.01); *Y10T 409/105565* (2015.01); *Y10T 409/108586* (2015.01); *Y10T 483/138* (2015.01); *Y10T 483/17* (2015.01); *Y10T 483/1705* (2015.01); *Y10T 483/1736* (2015.01)

(58) Field of Classification Search
  CPC . Y10T 409/105724; Y10T 409/105088; Y10T 409/104929; Y10T 409/105247; Y10T 409/107632; Y10T 409/10–109699; Y10T 409/100159; B23Q 3/155–3/15793
  USPC ........................................................ 409/1–62
  See application file for complete search history.

(56) References Cited

U.S. PATENT DOCUMENTS

| | | | |
|---|---|---|---|
| 10,661,367 B2* | 5/2020 | Sato | B23F 19/104 |
| 2010/0221080 A1* | 9/2010 | Neumaier | B23F 23/003 |
| | | | 409/13 |
| 2020/0114439 A1* | 4/2020 | Ohno | B23F 23/1218 |
| 2021/0331261 A1* | 10/2021 | Takeuchi | B23F 5/20 |
| 2022/0009016 A1* | 1/2022 | Takemori | B23F 23/006 |

FOREIGN PATENT DOCUMENTS

| | | | |
|---|---|---|---|
| JP | 63-174815 A | * | 7/1988 |
| JP | 03-213212 A | * | 9/1991 |
| JP | 03-245938 A | * | 11/1991 |
| JP | 04-336915 A | * | 11/1992 |
| JP | 2000-141129 A | * | 5/2000 |
| JP | 2000-210817 A | | 8/2000 |
| JP | 2007-086953 A | * | 4/2007 |
| JP | 2014-172112 A | | 9/2014 |
| JP | 2020-059088 A | * | 4/2020 |

OTHER PUBLICATIONS

Machine Translation of JP 03-245938 A, which JP '938 was published Nov. 1991.*
Machine Translation of DE 19918289-A1, which DE'289 was published Oct. 2000.*
Machine Translation of JP 2020-059088-A, which JP '088 was published Apr. 16, 2020.*
Machine Translation of JP 63-174815 A, which JP '815 was published Jul. 1988.*

* cited by examiner

FIG. 7B

MACHINE TOOL AND GEAR MACHINING METHOD

CROSS-REFERENCE TO RELATED APPLICATIONS

This application is based on and claims priority under 35 USC 119 from Japanese Patent Application No. 2018-203841 filed on Oct. 30, 2018, the contents of which are incorporated herein by reference.

TECHNICAL FIELD

The present disclosure relates to a machine tool and a gear machining method using the machine tool.

BACKGROUND ART

A gear machining method in which a hob cutter or a skiving cutter is used is known. As a gear machining method using a hob cutter, for example, JP2000-210817A discloses a gear machining method in which rough machining is performed by using a roughing hob, and then finish machining is performed by using a finishing hob. JP2014-172112A discloses a gear machining method using a skiving cutter.

In gear machining using a hob cutter, the lifetime of the tool is long as compared with that using a skiving cutter, but a sufficiently high machining accuracy cannot be obtained. In the case where accurate machining is to be performed by using a hob cutter, the feed distance of the hob cutter must be shortened. When finish machining is performed by using a hob cutter, therefore, the time period required to perform the finish machining is prolonged. In gear machining using a skiving cutter, by contrast, accurate machining can be performed, but the skiving cutter is easily worn in a short time, and the cutting amount must be reduced. When rough machining is performed by using a skiving cutter, consequently, the time period required to perform the rough machining is prolonged.

SUMMARY OF INVENTION

The present disclosure is to provide a machine tool in which shortening of the machining time and enhancement of the machining accuracy can be compatible with each other while suppressing the cost of working tools, and a gear machining method using the machine tool.

According to an aspect of the present disclosure, a machine tool includes a workpiece holder that is configured to rotatably hold a workpiece, a tool holder that is configured to be relatively movable with respect to the workpiece holder while rotatably holding working tools configured to machine the workpiece, the working tools being configured to be attachable to and detachable from the tool holder, and including a hob cutter that is to be used in a rough machining of the workpiece and a skiving cutter that is to be used in a finish machining of the workpiece, a tool magazine that is configured to house the working tools, a tool replacing device that is configured to replace one of the working tools mounted on the tool holder with the other of working tools housed in the tool magazine, a rough machining controlling section that is configured to perform the rough machining on the workpiece by relatively moving the workpiece and the hob cutter while synchronously rotating the workpiece that is held by the workpiece holder and the hob cutter that is mounted on the tool holder, a tool measuring device that is configured to measure a position of a blade in a rotation direction of the skiving cutter in a finish machining preparation state where the workpiece holder and the tool holder are placed in a predetermined finish machining start position while directing each of the workpiece and the skiving cutter toward a predetermined rotation start angle, an angle correcting section that, in the finish machining preparation state, is configured to correct a rotation angle of the skiving cutter with respect to the workpiece based on a result measured by the tool measuring device, and that places a tooth space formed in the workpiece and an edge tip of the blade of the skiving cutter which is mounted on the tool holder in a position corresponding to each other, and a finish machining controlling section that is configured to relatively move the workpiece and the skiving cutter while synchronously rotating the workpiece and the skiving cutter such that the workpiece is finish machined.

A method for machining a gear, the method includes mounting a workpiece on a workpiece holder, mounting a hob cutter on a tool holder, relatively moving the workpiece and the hob cutter while synchronously rotating the workpiece and the hob cutter so as to perform a rough machining with respect to the workpiece, mounting a skiving cutter onto the tool holder, together with dismounting the hob cutter and housing the dismounted hob cutter into a tool magazine by using a tool replacing device, the hob cutter having been mounted on the tool holder and the skiving cutter having been housed in the tool magazine, measuring a position of a blade in a rotation direction of the skiving cutter by using a tool measuring device, in a state where the workpiece holder and the tool holder are placed in a predetermined finish machining start position while directing each of the workpiece and the skiving cutter toward a predetermined rotation start angle, correcting a rotation angle of the skiving cutter with respect to the workpiece based on a result measured in the measuring, and placing a tooth space formed in the workpiece which is held by the workpiece holder and which has been rough machined, and an edge tip of the skiving cutter which has been mounted on the tool holder in a position corresponding to each other, and relatively moving the workpiece and the skiving cutter while synchronously rotating the workpiece and the skiving cutter such that the workpiece is finish machined.

According to the machine tool, and gear machining method using the machine tool of the present disclosure, rough machining is performed by using a hob cutter, and therefore the time period required to perform rough machining can be shortened. In the machine tool and the gear machining method, namely, a hob cutter is used in rough machining in which the machining allowance is large in the case where a workpiece is to be cut, whereby the cutting amount can be increased while suppressing wear of the working tool, as compared with the case where a skiving cutter is used. In the machine tool and the gear machining method, by contrast, a skiving cutter is used in finish machining in which the machining allowance is small in the case where the workpiece is to be cut, whereby accurate machining can be performed as compared with the case where a hob cutter is used. In the machine tool and gear machining method using the machine tool of the present disclosure, consequently, shortening of the machining time and enhancement of the machining accuracy can be compatible with each other while suppressing the cost of working tools.

In the finish machining preparation state, in addition, the angle correcting section corrects the angle of the skiving cutter with respect to the workpiece, and the tooth space that is formed in the workpiece that is held by the workpiece holder, and that has been rough machined, and the edge tip of the skiving cutter that is mounted on the tool holder are placed in corresponding positions. In the machine tool and the gear machining method, therefore, a gear that is formed after finish machining can be formed into a desired shape.

DESCRIPTION OF EMBODIMENTS

1. Schematic Configuration of Machine Tool 1

Figure 1:
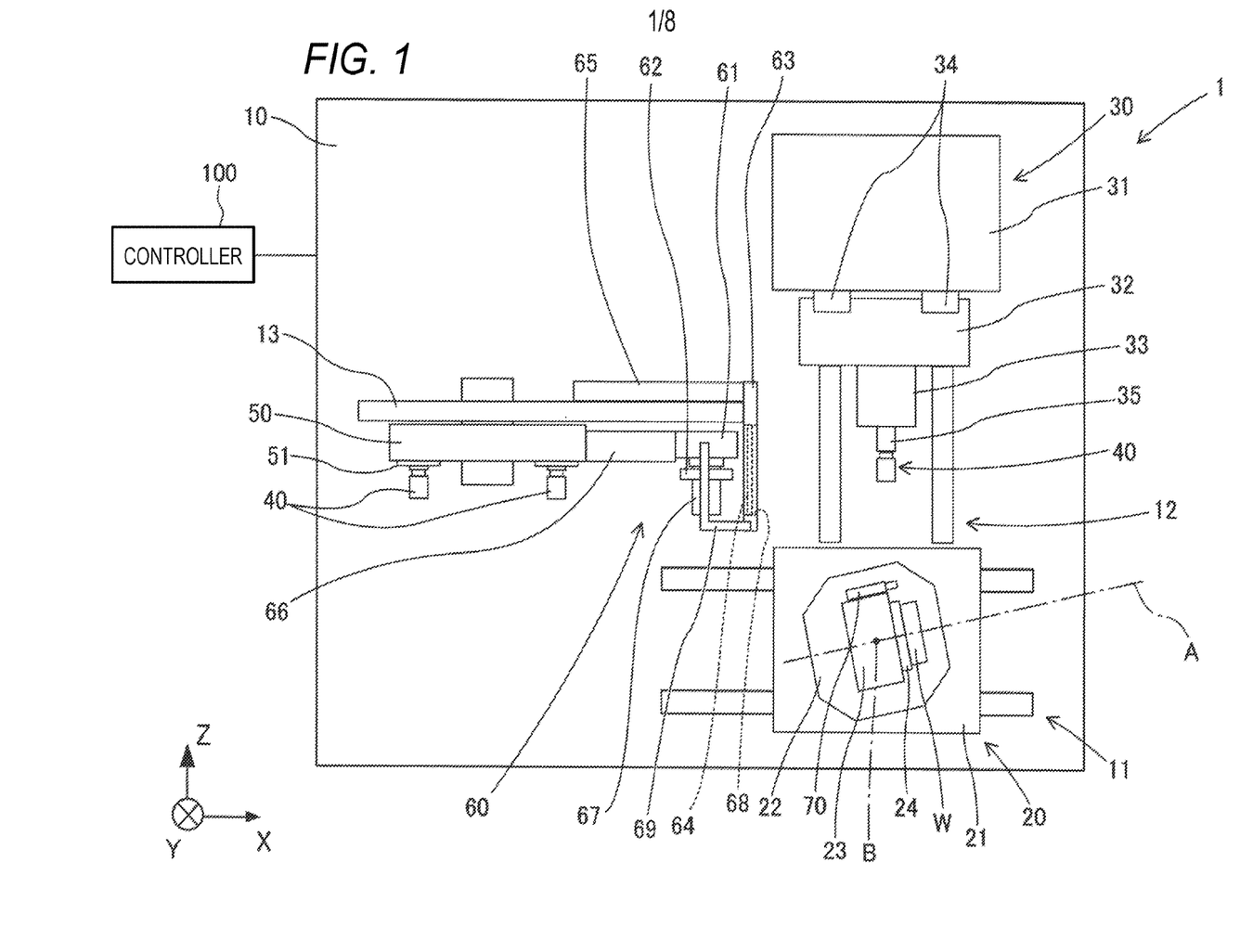
FIG. 1 is a plan view of a machine tool of an embodiment of the present disclosure.
Figure 2A:
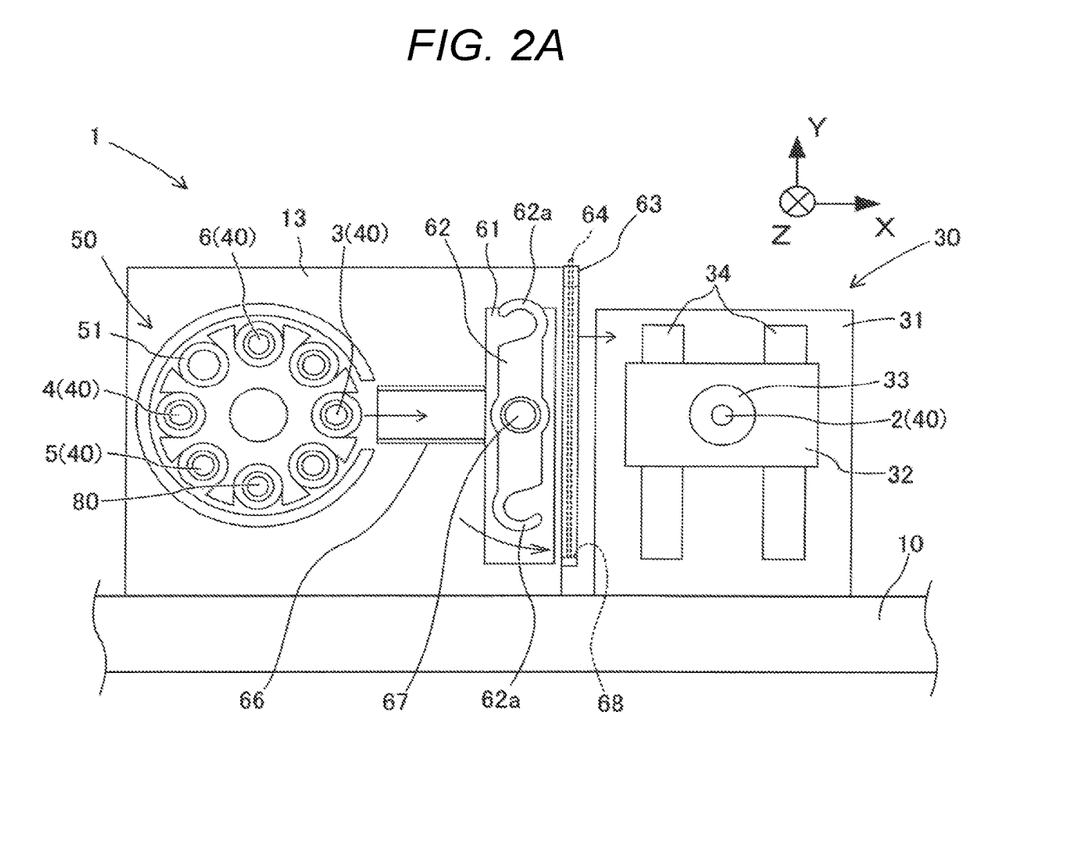
FIG. 2A is a front view of the machine tool.
Figure 2B:
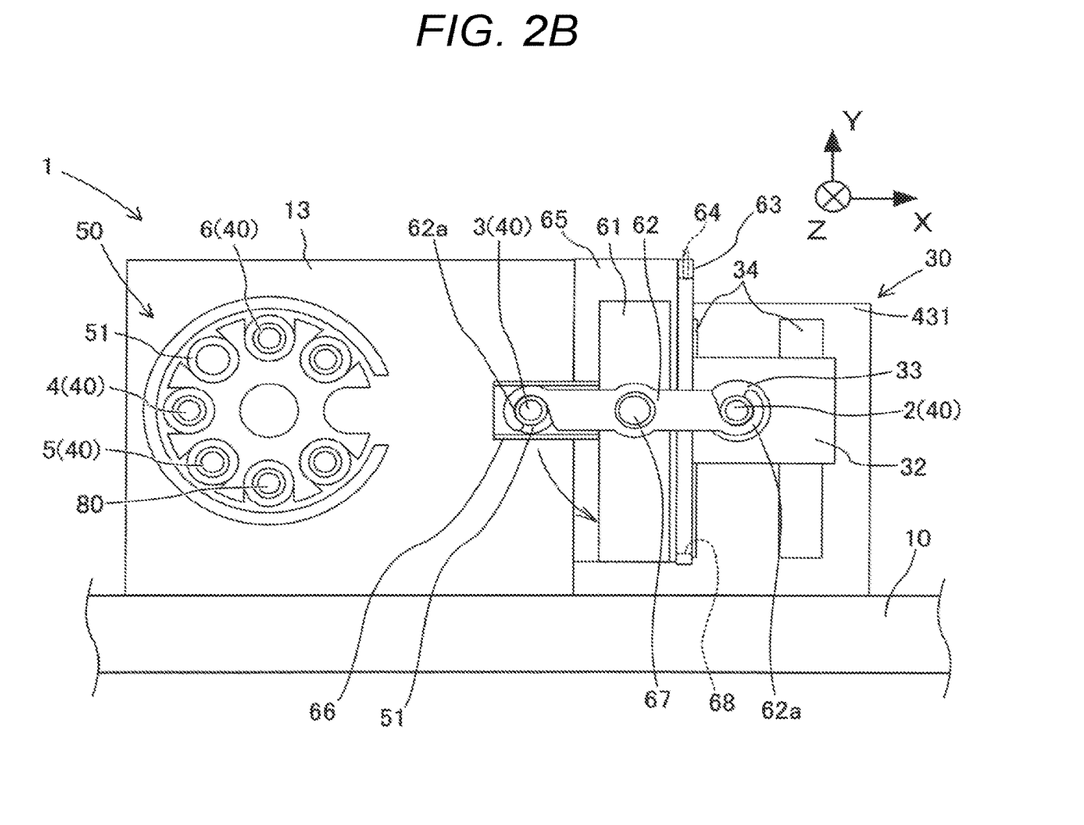
FIG. 2B is a front view of the machine tool, showing a state where a movement of a device main unit toward a column, and a rotation of a replacement arm have been started.

Hereinafter, an embodiment to which the machine tool, and gear machining method using the machine tool of the present disclosure are applied will be described with reference to the drawings. Referring to FIGS. 1 to 2B, first, the configuration of a machine tool 1 will be schematically described.

As shown in FIG. 1, the machine tool 1 is used mainly in formation of an external gear in a workpiece W. The machine tool 1 mainly includes a bed 10, a workpiece holder 20, a tool holder 30, a plurality of working tools 40, a tool magazine 50, a tool replacing device 60, a tool measuring device 70, a workpiece measuring device 80 (see FIG. 2A), and a controller 100.

The bed 10 is formed into an approximately rectangular shape. The workpiece holder 20 mainly includes a moving table 21, a swivel table 22, and a workpiece headstock 23. The moving table 21 is disposed so as to be movable relative to the bed 10. Specifically, a pair of X-axis guide rails 11 that elongate in the X-axis direction (lateral direction in FIG. 1) are disposed on the bed 10, and the moving table 21 is driven by a screw feeding mechanism that is not shown, to reciprocally move in the X-axis direction while being guided by the pair of X-axis guide rails 11.

The swivel table 22 is disposed on the moving table 21, and reciprocally moves in the X-axis direction integrally with the moving table 21. The swivel table 22 is disposed so as to be rotatable relative to the moving table 21 about the B axis that is parallel to the Y axis direction. A swivel motor that is not shown is housed in the swivel table 22. The swivel table 22 is driven by the swivel motor to swivel about the B axis.

The workpiece headstock 23 is disposed on the swivel table 22, and swivels integrally with the swivel table 22 about the B axis. A workpiece spindle 24 that is held rotatably about the A axis which is orthogonal to the B axis is disposed on the workpiece headstock 23. The workpiece W is detachably mounted on the workpiece spindle 24. A workpiece rotation motor (not shown) for rotating the workpiece spindle 24, and an encoder (not shown) for detecting the rotation angle of the workpiece spindle 24 are disposed in the workpiece headstock 23. In this way, the workpiece holder 20 is disposed movably with respect to the head 10, and rotatably holds the workpiece W.

The tool holder 30 mainly includes a column 31, a saddle 32, and a tool headstock 33. The column 31 is disposed movably relative to the bed 10. Specifically, a pair of Z-axis guide rails 12 that elongate in the Z-axis direction (vertical direction in FIG. 1) are disposed on the bed 10. The column 31 is driven by a screw feeding mechanism that is not shown, to reciprocally move in the Z-axis direction while being guided by the pair of Z-axis guide rails 12.

The saddle 32 is placed on one side surface of the column 31 that is parallel to a plane orthogonal to the Z-axis direction. A pair of Y-axis guide rails 34 that elongate in the Y-axis direction (direction perpendicular to the sheet of FIG. 1) are disposed on the side surface of the column 31. The saddle 32 is driven by a screw feeding mechanism that is not shown, to reciprocally move in the Y-axis direction.

The tool headstock 33 is disposed on the saddle 32, and moved in the Y-axis direction integrally with the saddle 32. A tool spindle 35 that is disposed rotatably about an axis which is parallel to the Z-axis direction is disposed on the tool headstock 33. A working tool 40 is detachably mounted on the tool spindle 35. A tool rotation motor (not shown) for rotating the tool spindle 35, and an encoder (not shown) for detecting the rotation angle of the tool spindle 35 are disposed in the tool headstock 33. In this way, the tool holder 30 is disposed relatively movably with respect to the workpiece holder 20, and rotatably holds the working tool 40.

The working tool 40 is a rotating tool that is used in machining of the workpiece W. When a plurality of working tools 40 are not used, the working tools are housed in the tool magazine 50, and, when one of the working tools is to be used, the tool is mounted on the tool spindle 35. In FIG. 1, in order to simplify the drawing, only two working tools 40 are illustrated.

The tool magazine 50 can house a plurality of working tools 40. The tool magazine 50 is supported rotatably about an axis that is parallel to the Z axis, relative to a planar support plate 13 that is fixed to the bed 10. A plurality of sockets 51 are detachably mounted on the tool magazine 50, and the plurality of working tools 40 are housed in the sockets 51, respectively.

The tool replacing device 60 is placed between the tool magazine 50 and the tool holder 30 in the X-axis direction. The tool replacing device 60 replaces the working tool 40 mounted on the tool spindle 35 with one of the tools 40 housed in the tool magazine 50. The tool replacing device 60 will be described later in detail.

In the state where a skiving cutter 3 is mounted on the tool spindle 35, the tool measuring device 70 measures the rotation direction position of an edge tip of a blade formed in the skiving cutter 3. The tool measuring device 70 is fixed to the workpiece headstock 23, and moved and swiveled integrally with the workpiece headstock 23. The workpiece measuring device 80 (see FIG. 2A) measures the rotation direction position of a tooth space formed in the workpiece W. The workpiece measuring device 80 can be attached to and detached from the tool spindle 35, and, when the workpiece measuring device is not used, the device is housed in the tool magazine 50.

The controller 100 generally controls the machine tool 1. Through driving controls of various motors disposed in the machine tool 1, for example, the controller 100 performs controls of: the positions of the moving table 21, the column 31, and the saddle 32; the swiveling of the swivel table 22; and the rotations of the workpiece spindle 24 and the tool spindle 35; and controls relating to the operations of the tool magazine 50 and the tool replacing device 60. The controller 100 will be described later in detail.

2. Tool Replacing Device 60

Referring of FIGS. 1 and 2A, next, the configuration of the tool replacing device 60 will be described. As shown in FIGS. 1 and 2A, the tool replacing device 60 mainly includes a device main unit 61, a replacement arm 62, a frame portion 63, a door 64, a moving member 65, and a tool holding portion 66.

The device main unit 61 supports the replacement arm 62 so as to be rotatable about an axis that is parallel to the Z axis. When the replacement arm 62 is driven by an arm motor 67, the replacement arm is rotated about the axis that is parallel to the Z axis. Approximately S-like grasping portions 62a that are formed into a hook-like shape are formed in the both longitudinal ends of the replacement arm 62, respectively. The replacement arm 62 grasps working tools 40 by using the grasping portions 62a.

The frame portion 63 is placed in a position that is closer to the tool holder 30 than the support plate 13, and between the tool magazine 50 and the tool holder 30 in the X-axis direction. In the frame portion 63, an opening 68 is formed in a position that is opposed to the replacement arm 62 in the X-axis direction.

The door 64 is disposed on the frame portion 63 to open and close the opening 68. A spring that is not shown is disposed in the frame portion 63. When the door 64 is wound up by the urging force of the spring, the opening 68 is opened. An actuator (not shown) that is coupled to the door 64 is disposed in the frame portion 63. When the actuator is driven, the door 64 is spread against the urging force of the spring, and the opening 68 is closed.

During machining of the workpiece W, the tool replacing device 60 is placed in the position where the device does not interfere with the column 31. In the tool replacing device 60, the opening 68 is closed by the door 64, and an area on the side of the tool holder 30, and that on the side of the tool magazine 50 are defined. During machining of the workpiece W, therefore, the tool replacing device 60 can prevent chips, coolant, and the like from scattering toward the area on the side of the tool magazine 50 through the opening 68.

The moving member 65 is disposed on the support plate 13 on the side that is opposite to the device main unit 61. A screw feeding mechanism that is not shown is disposed on the support plate 13 on the surface that is opposite to that on which the tool magazine 50 is mounted. The moving member 65 is disposed so that the member can be relatively moved with respect to the support plate 13 in the X-axis direction by the screw feeding mechanism. The moving member 65 is formed integrally with the frame portion 63, and the device main unit 61 is coupled to the frame portion 63 through a bracket 69. Namely, the device main unit 61 and the frame portion 63 are disposed so as to be integrally movable in the X-axis direction along with the movement of the moving member 65.

The tool holding portion 66 is disposed on the device main unit 61, and movable integrally with the device main unit 61. The tool holding portion 66 holds one of the working tools 40 that is to be replaced with another tool 40 which is mounted on the tool spindle 35. An actuator that is not shown is disposed on the device main unit 61, and the tool holding portion 66 holds the working tool 40 that is taken out from the tool magazine 50 by the actuator.

3. Operation of Machine Tool 1 in Replacement of Working Tools 40

Referring to FIGS. 2A and 2B, next, the operation of the machine tool 1 that is performed when the working tools 40 are replaced with each other will be described. Although, here, a case where the working tool 40 mounted on the tool spindle 35 is detached from the tool spindle, and one of the working tools 40 that are housed in the tool magazine 50 is mounted on the tool spindle 35 will be exemplarily described, the same is applied also to the case where the workpiece measuring device 80 is attached to or detached from the tool spindle 35.

When the replacement of working tools 40 by the tool replacing device 60 is to be started, as shown in FIG. 2A, the tool magazine 50 places the working tool 40 that is to be mounted on the tool spindle 35, in the position opposed to the tool holding portion 66. Thereafter, the tool magazine 50 transfers the working tool 40 and socket 51 that are placed in the position opposed to the tool holding portion 66, to the tool holding portion 66 by using the actuator that is not shown. As a result, the working tool 40 that is to be mounted on the tool spindle 35 is placed in the position where the working tool can be grasped by one of the grasping portions 62a of the replacement arm 62.

By contrast, the tool holder 30 moves the column 31 to the position where the column does not interfere with the tool replacing device 60, and places the working tool 40 mounted on the tool spindle 35 in the position where the working tool can be grasped by the other one of the grasping portions 62a of the replacement arm 62. Moreover, the tool replacing device 60 opens the door 64 to open the opening 68, and moves the device main unit 61 toward the tool holder 30.

When the movements of the column 31 and the device main unit 61 are ended, as shown in FIG. 2B, the replacement arm 62 replaces the working tool 40 mounted on the tool spindle 35 with the working tool 40 held by the tool holding portion 66. Specifically, the replacement arm 62 grasps, by using the grasping portions 62a, both the working tool 40 mounted on the tool spindle 35, and the working tool 40 held by the tool holding portion 66, and detaches the working tools 40, 40 from the tool spindle 35 and the tool holding portion 66, respectively. Then, the tool replacing device 60 swings the replacement arm 62, whereby the working tool 40 detached from the tool holding portion 66 is placed in front of the tool spindle 35, and the working tool 40 detached from the tool spindle 35 is placed in front of the tool holding portion 66. Thereafter, the replacement arm 62 mounts the working tools 40, 40 on the tool spindle 35 and the tool holding portion 66, respectively.

When the replacement of the working tools 40 by the replacement arm 62 is ended, the tool replacing device 60 moves the device main unit 61 toward the tool magazine 50, the longitudinal direction of the replacement arm 62 is oriented in the Y-axis direction, and the opening 68 is closed by the door 64. At the timing when the tool replacing device 60 is moved to the position where the device does not interfere with the column 31, the tool holder 30 moves the column 31 toward the workpiece holder 20, and places the working tool 40 in a predetermined machining start position.

4. Working Tool 40

Next, the working tools 40 that are housed in the tool magazine 50 will be described. As working tools 40 for forming teeth in the workpiece W, as shown in FIGS. 2A and 2B, a hob cutter 2 and the skiving cutter 3 are housed in the tool magazine 50. In the case where external teeth are to be formed in the workpiece W, as described later, the machine tool 1 performs rough machining by using the hob cutter 2, and then performs finish machining by using the skiving cutter 3.

As a working tool 40 (pre-machining tool) that is used in machining which is performed before teeth are formed in the workpiece W, moreover, a turn cutting tool 4 for turn-cutting the workpiece W is housed in the tool magazine 50. As working tools 40 (post-machining tools) that are used in machining which is performed after teeth are formed in the workpiece W, furthermore, a chamfering tool 5 that is used in chamfering, a drilling tool 6 that is used in drilling, and the like are housed in the tool magazine 50.

Figure 3:
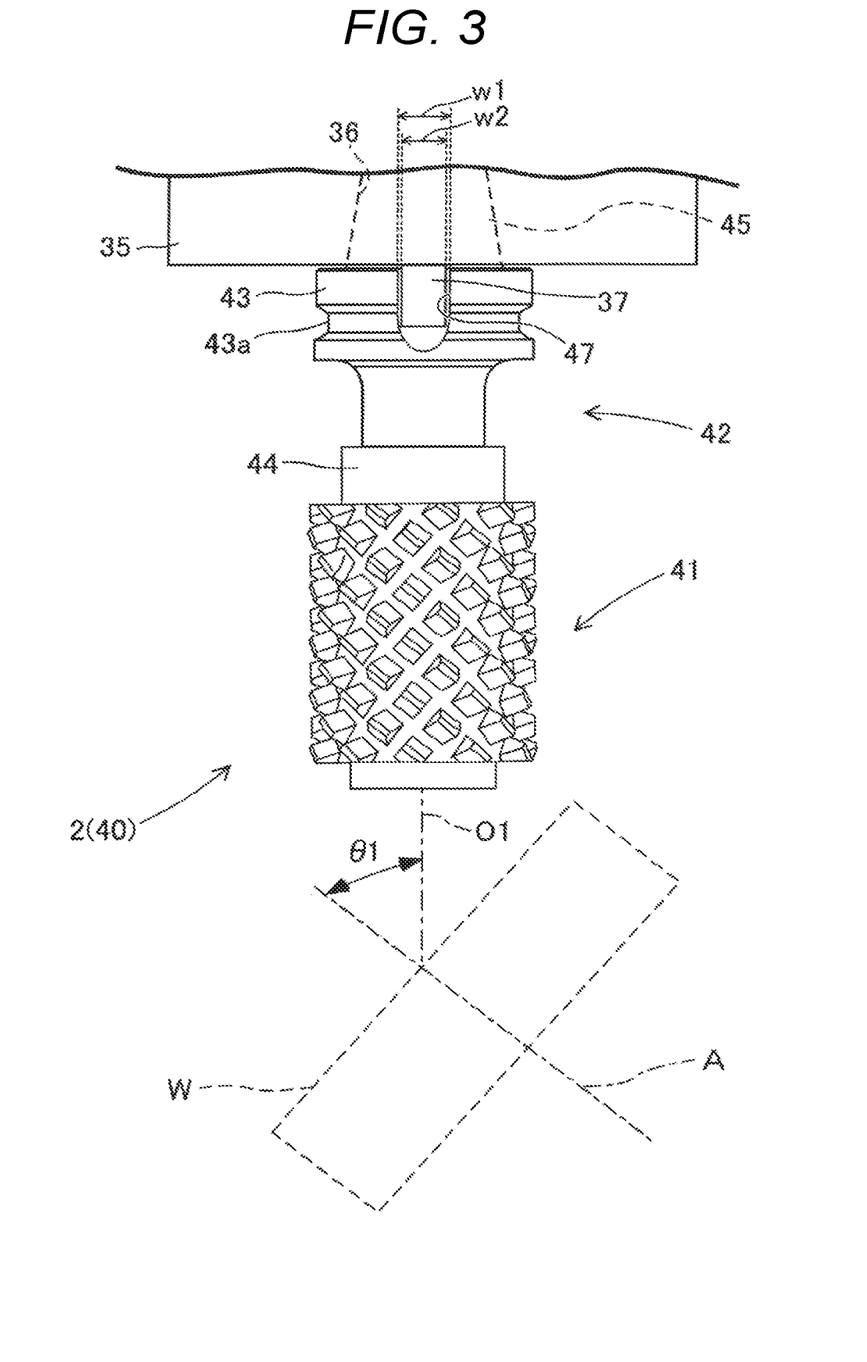
FIG. 3 is a view showing the arrangement of a hob cutter and a workpiece in a rough machining preparation state.
Figure 4:
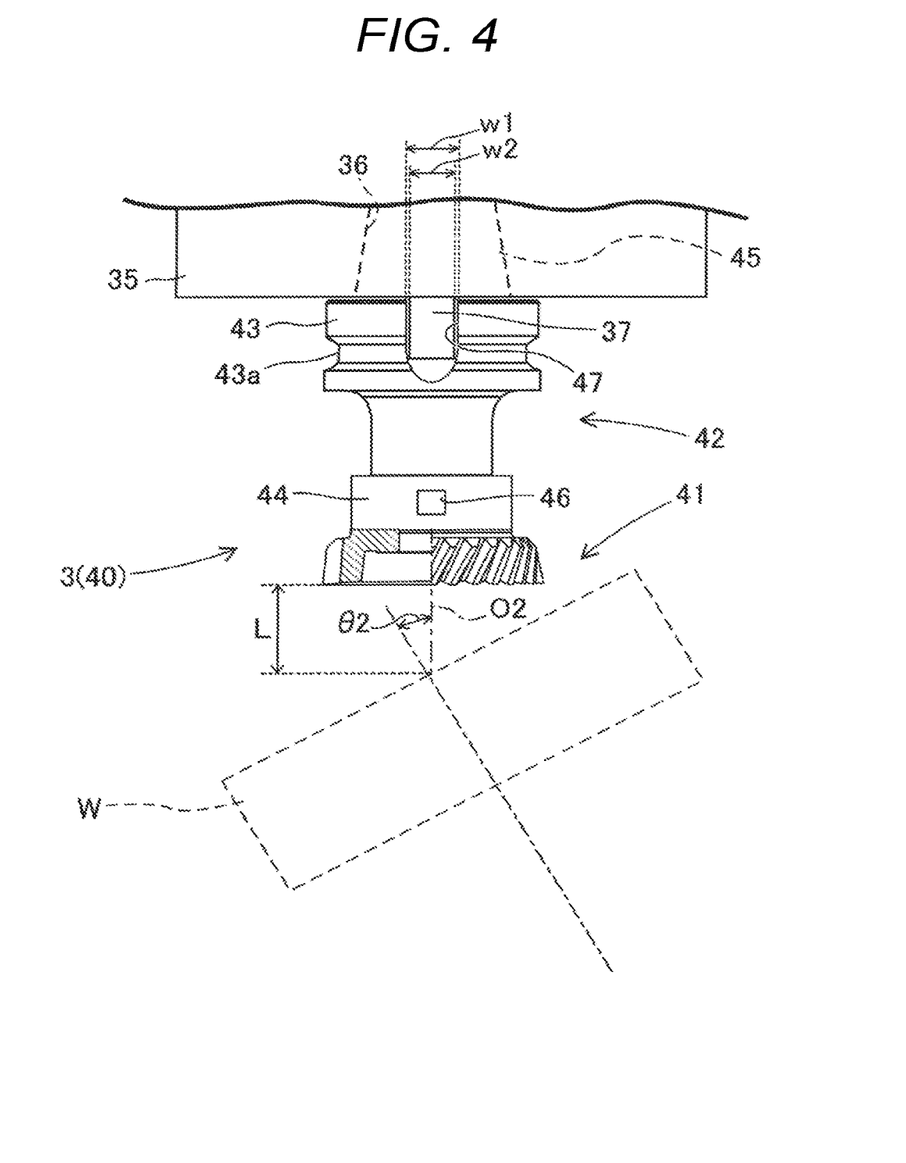
FIG. 4 is a view showing the arrangement of a skiving cutter and the workpiece in a finish machining preparation state.

As shown in FIGS. 3 and 4, each of the plurality of working tools 40 includes an edge portion 41 and a holder portion 42. The edge portion 41 is a portion that performs machining on the workpiece W. In the edge portion 41, a blade corresponding to the purpose of the working tool 40 is formed.

For example, a plurality of rows of blades are formed in the edge portion 41 of the hob cutter 2 shown in FIG. 3. The plurality of rows of blades are formed by causing thread grooves that are inclined with respect to the rotation axis of the hob cutter 2, to cross a thread ridge that extends along a helical line. By contrast, a plurality of blades that have a helix angle with respect to the central axis O2 of the working tool 40 are formed in the edge portion 41 of the skiving cutter 3 shown in FIG. 4. The radially outer surface of each of the blades formed in the skiving cutter 3 has a relief angle with respect to the central axis O2 of the working tool 40, and the end surface of each blade has a cutting face with respect to a plane orthogonal to the central axis O2 of the working tool 40.

The holder portion 42 is a portion that is formed integrally with the edge portion 41. The holder portions 42 that are disposed in the respective working tools 40 are formed in an approximately same shape. In the workpiece measuring device 80, a holder portion 42 that is similar to that of the working tool 40 is disposed. Each of the holder portions 42 includes a flange portion 43, a connecting portion 44, and a shank portion 45.

The flange portion 43 is a portion that, in the tool replacement, is to be grasped by the replacement arm 62 of the tool replacing device 60. The flange portion 43 is formed so as to be radially outwardly projected relative to the connecting portion 44 and the shank portion 45. A grasping groove 43a which extends in the circumferential direction is formed in the outer circumferential surface of the flange portion 43. The grasping portions 62a (see FIG. 2A) that is formed in the replacement arm 62 can be inserted into the grasping groove 43a. The tool replacing device 60 rotates the replacement arm 62 to insert the grasping portions 62a into the grasping groove 43a, and grasps the working tool 40.

The connecting portion 44 is a portion that is located between the edge portion 41 and the flange portion 43, and formed so as to be smaller in diameter than the edge portion 41 and the flange portion 43. A to-be-detected part 46 that can be detected by a sensor (not shown) disposed in the tool measuring device 70 is disposed on the connecting portion 44 of the skiving cutter 3. The to-be-detected part 46 is a portion that is radially outwardly projected from the outer circumferential surface of the connecting portion 44, and placed in a position which is associated with the position of the edge tip of the skiving cutter 3 in the rotation direction of the skiving cutter 3. Namely, the to-be-detected part 46 functions as the reference in the case where the rotation direction position of the blade formed in the edge portion 41 is to be known.

The shank portion 45 is a taper-shaped portion that is located on the side of the flange portion 43 opposite to the connecting portion 44. The shank portion 45 is formed so as to be insertable into an insertion hole 36 that is formed in the tool spindle 35. The working tool 40 is held by the tool spindle 35 in the state where the shank portion 45 is inserted into the insertion hole 36.

A fitted part 37 that is projected in the Z-axis direction from the surface of the tool spindle 35 in which the insertion hole 36 is formed is disposed in the tool holder 30. By contrast, a groove-like fitting part 47 that is to be fitted to the fitted part 37 is formed in the flange portion 43. The fitting part 47 is fitted to the fitted part 37 in the state where the working tool 40 is mounted on the tool spindle 35. In the machine tool 1, when the working tool 40 is mounted on the tool spindle 35 in the state where the fitting part 47 is fitted to the fitted part 37, the working tool 40 can be roughly positioned in the rotation direction with respect to the tool spindle 35.

The width w1 of the fitting part 47 in the rotation direction of the working tool 40 is set to a dimension that is larger than the width w2 of the fitted part 37 in the rotation direction of the tool spindle 35. Even when the working tool 40 is mounted on the tool spindle 35 in the state where the fitting part 47 is fitted to the fitted part 37, therefore, fitting backlash may be produced in the rotation direction of the tool spindle 35 within a constant range. After the skiving cutter 3 is mounted on the tool spindle 35, and before machining by the skiving cutter 3 is started, consequently, the machine tool 1 measures the position of the edge tip in the rotation direction of the skiving cutter 3 by using the tool measuring device 70. Therefore, the machine tool 1 can correctly know the position of the edge tip of the skiving cutter 3 in the state where the working tool 40 is mounted on the tool spindle 35.

5. Outline of Controller 100

Figure 5:
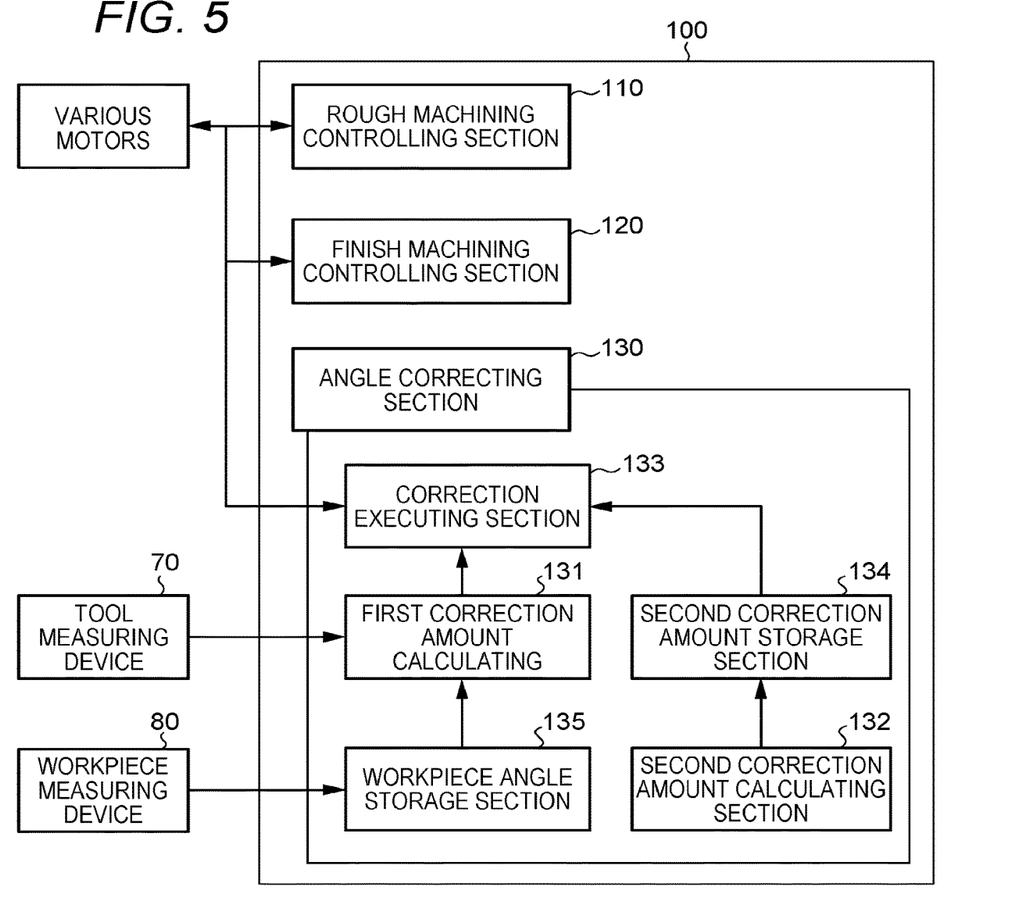
FIG. 5 is a block diagram of a controller.

Referring to FIG. 5, next, the controller 100 will be described. As shown in FIG. 5, the controller 100 includes a rough machining controlling section 110, a finish machining controlling section 120, and an angle correcting section 130.

In the machine tool 1, in the case where external teeth are generated in the workpiece W, rough machining is performed by using the hob cutter 2, and thereafter finish machining is performed by using the skiving cutter 3. The rough machining controlling section 110 performs various controls during rough machining of the workpiece, and the finish machining controlling section 120 performs various controls during finish machining of the workpiece. At the start of finish machining, the angle correcting section 130 corrects the rotation angle displacement between the workpiece W that is mounted on the workpiece spindle 24, and that has been rough machined, and the skiving cutter 3 that is mounted on the tool spindle 35. Hereinafter, a series of controls that are performed by the rough machining controlling section 110, the finish machining controlling section 120, and the angle correcting section 130 will be specifically described with reference to the drawings shown FIGS. 1 to 4.

(5-1: Rough Machining Controlling Section 110)

Next, a series of rough machining controls that are performed by the rough machining controlling section 110 will be described. As shown in FIGS. 1 and 2A, the rough machining controlling section 110 first controls the tool magazine 50 and the tool replacing device 60 so as to mount the hob cutter 2 housed in the tool magazine 50, on the tool spindle 35.

Then, the rough machining controlling section 110 controls the workpiece holder 20 and the tool holder 30 to prepare to start rough machining. Specifically, the rough machining controlling section 110 causes the column 31 and the saddle 32 to move in the Z- and Y-axis directions, whereby the hob cutter 2 mounted on the tool spindle 35 is placed in a predetermined rough machining start position. Similarly, the rough machining controlling section 110 causes the moving table 21 to move in the X-axis direction, whereby the workpiece W mounted on the workpiece spindle 24 is placed in a predetermined rough machining start position. In addition, the rough machining controlling section 110 causes the swivel table 22 to swivel about the B axis so that the inclination angle of the A axis with respect to the central axis O1 of the hob cutter 2 is a predetermined intersection angle θ1 (see FIG. 3). At this time, a predetermined gap is disposed between the hob cutter 2 and the workpiece W.

Moreover, the rough machining controlling section 110 controls driving of a workpiece rotation motor (not shown) to set the workpiece spindle 24 on which the workpiece W is mounted, to a predetermined rotation start angle, and controls driving of a tool rotation motor (not shown) to set the tool spindle 35 on which the hob cutter 2 is mounted, to a predetermined rotation start angle. In this way, the rough machining controlling section 110 sets the positions and rotation angles of the workpiece W and the hob cutter 2 to a rough machining preparation state shown in FIG. 3.

Then, the rough machining controlling section 110 causes the hob cutter 2 to move relatively to the workpiece W in the direction of the central axis O1 while synchronously rotating the workpiece W and the hob cutter 2. Namely, the rough machining controlling section 110 causes the column 31 to move relatively to the moving table 21 in the Z-axis direction while synchronously rotating the workpiece spindle 24 on which the workpiece W is mounted, and the tool spindle 35 on which the hob cutter 2 is mounted. As a result, rough-machined teeth are formed in the workpiece W. Then, a machining allowance M that is to be cut away in finish machining is left on the workpiece W that has been rough machined (see FIG. 6).

(5-2: Finish Machining Controlling Section 120)

Then, a series of finish machining controls that are performed by the finish machining controlling section 120 will be described. As shown in FIGS. 1 and 2B, the finish machining controlling section 120 first causes the skiving cutter 3 housed in the tool magazine 50, to be mounted on the tool spindle 35. Thereafter, the finish machining controlling section 120 controls the workpiece holder 20 and the tool holder 30 to prepare to start finish machining.

Specifically, the finish machining controlling section 120 causes the column 31 and the saddle 32 to move in the Z- and Y-axis directions, whereby the skiving cutter 3 mounted on the tool spindle 35 is placed in a predetermined finish machining start position. Moreover, the finish machining controlling section 120 causes the swivel table 22 to swivel about the B axis so that the inclination angle of the A axis with respect to the central axis O2 of the skiving cutter 3 is a predetermined intersection angle θ2 (see FIG. 4). At this time, a predetermined gap (separation distance L) is disposed between the skiving cutter 3 and the workpiece W.

Moreover, the finish machining controlling section 120 controls driving of a workpiece motor (not shown) and a tool motor (not shown) to place the edge tip of the skiving cutter 3 in a position corresponding to the position of a tooth space formed in the workpiece W that has been rough machined.

Then, the finish machining controlling section 120 causes the skiving cutter 3 to move relatively to the workpiece W in the direction of the central axis O2 while synchronously rotating the workpiece W and the skiving cutter 3. Namely, the finish machining controlling section 120 causes the column 31 to move relatively to the moving table 21 in the Z-axis direction while synchronously rotating the workpiece spindle 24 on which the workpiece W is mounted, and the tool spindle 35 on which the skiving cutter 3 is mounted. As a result, finish-machined teeth are formed in the workpiece W mounted on the workpiece spindle 24, and the machining allowance M that is left on the rough-machined workpiece W is cut away by the skiving cutter.

(5-3: Angle Correcting Section 130)

Next, the angle correcting section 130 will be described. In the machine tool 1, when the rough machining is ended, the hob cutter 2 that is mounted on the tool spindle 35 is dismounted in the state where the workpiece W remains to be mounted on the workpiece spindle 24, and the skiving cutter 3 is mounted on the tool spindle 35. At this time, the machine tool 1 must place the edge tip of the skiving cutter 3 mounted on the tool spindle 35, in the position corresponding to the position of a tooth space formed in the workpiece W that has been rough machined. In the case where a helical gear is to be formed on the workpiece W, moreover, the machine tool 1 must adjust the position of the edge tip in the rotation direction of the skiving cutter 3 mounted on the tool spindle 35, in accordance with the specifications of the helical gear to be formed.

After the workpiece W and the skiving cutter 3 are placed in the finish machining start positions, therefore, the angle correcting section 130 corrects the rotation angle of the skiving cutter 3 with respect to the workpiece W so that the edge tip of the skiving cutter 3 mounted on the tool spindle 35 is placed in the position corresponding to the position of a tooth space of the workpiece W that is mounted on the workpiece spindle 24, and that has been rough machined.

The angle correcting section 130 includes a first correction amount calculating section 131, a second correction amount calculating section 132, a correction executing section 133, a second correction amount storage section 134, and a workpiece angle storage section 135. The first correction amount calculating section 131 calculates a necessary rotation angle correction amount of the workpiece W based on the rotation angle displacement amount between the tooth space of the rough-machined workpiece W that is held by the workpiece holder 20, and the edge tip of the skiving cutter 3 that is held by the tool holder 30. Hereinafter, the rotation angle correction amount that is obtained by calculation by the first correction amount calculating section 131 is referred to as "first correction amount α."

Here, the skiving cutter 3 is mounted on the tool spindle 35 in the state where the fitting part 47 disposed in the holder portion 42 is fitted to the fitted part 37 disposed in the tool spindle 35. At the timing when the skiving cutter 3 is mounted on the tool spindle 35, therefore, the edge tip of the skiving cutter 3 is placed approximately in the position corresponding to the position of a tooth space in the rough-machined workpiece W that is mounted on the workpiece spindle 24.

As described above, even in the state where the fitting part 47 is fitted to the fitted part 37, however, fitting backlash may be produced. Therefore, the rotation angle displacement of the skiving cutter 3 with respect to the tool spindle 35 is produced within a constant range. Consequently, the first correction amount calculating section 131 calculates the rotation angle displacement amount between the workpiece W and the skiving cutter 3, in a state where the skiving cutter 3 is mounted on the tool spindle 35.

Specifically, the finish machining controlling section 120 places the workpiece W mounted on the workpiece spindle 24, and the skiving cutter 3 mounted on the tool spindle 35 in the predetermined finish machining start positions. Next, the finish machining controlling section 120 sets the tool spindle 35 to the rotation start angle, and directs the skiving cutter 3 toward the rotation start angle. Moreover, the finish machining controlling section 120 sets the workpiece spindle 24 to the rotation start angle, and directs the workpiece W toward the rotation start angle.

In this way, the finish machining controlling section 120 sets the positions and rotation angles of the workpiece W and the skiving cutter 3 to a finish machining preparation state shown in FIG. 4. At this time, the machine tool 1 can cause the rotation angles of the workpiece spindle 24 and tool spindle 35 in the finish machining preparation state to coincide with those of the workpiece spindle 24 and tool spindle 35 in the rough machining preparation state.

Next, the angle correcting section 130 detects the position of the to-be-detected part 46 through the sensor disposed in the tool measuring device 70, and measures the position of the edge tip of the skiving cutter 3 based on the detected position of the to-be-detected part 46. Similarly, the angle correcting section 130 measures the position in the rotation direction of the tooth space formed in the workpiece W that has been rough machined, by using a sensor disposed in the workpiece measuring device 80. Thereafter, the first correction amount calculating section 131 calculates the rotation angle displacement amount between the edge tip of the skiving cutter 3 and the tooth space formed in the rough-machined workpiece W based on results of the measurements performed by the tool measuring device 70 and the workpiece measuring device 80.

In this way, the angle correcting section 130 corrects the rotation angle displacement due to fitting backlash between the fitted part 37 and the fitting part 47. Therefore, the teeth that are to be formed on the finish-machined workpiece W can be formed into a desired shape.

For example, the sensor disposed in the tool measuring device 70 is an eddy current sensor, and that disposed in the workpiece measuring device 80 is a touch sensor. However, sensors other than the above-described sensors may be used as the sensors that are disposed in the tool measuring device 70 and the workpiece measuring device 80.

Figure 6:
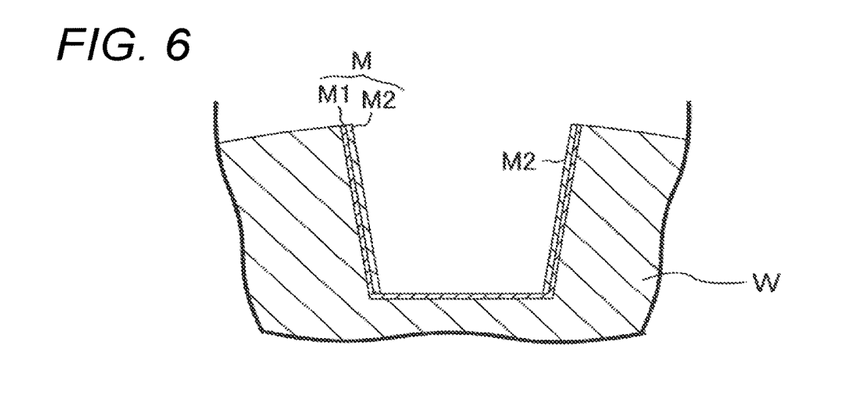
FIG. 6 is a view diagrammatically showing a machining allowance that remains in the rough-machined workpiece.

In the above, when the hob cutter 2 is mounted on the tool spindle 35, the machine tool 1 performs rough machining without detecting the position of the edge tip of the hob cutter 2. Instead, the rough machining controlling section 110 performs rough machining while leaving a machining allowance M2 in which fitting backlash is considered, in the workpiece W. As shown in FIG. 6, namely, the rough machining controlling section 110 leaves, as the machining allowance M that is left in the rough-machined workpiece W, the machining allowance M2 corresponding to the angle displacement due to fitting backlash, in addition to a machining allowance M1 corresponding to the amount of cutting by the skiving cutter 3 in finish machining. The machining allowance M2 is derived based on, for example, the dimension difference between the width w1 of the fitting part 47 and the width w2 of the fitted part 37. Then, the rough machining controlling section 110 performs rough machining while leaving the machining allowance M2.

Therefore, it is possible to avoid a situation where, during rough machining, the machine tool 1 erroneously cuts away a portion that is to remain after finish machining. In the machine tool 1, as a result, the correction of the rotation angle displacement in the state where the hob cutter 2 is mounted on the tool holder 30 may be omitted, whereby the cycle time can be shortened.

At the start of finish machining, by contrast, the machine tool 1 measures the rotation angle displacement of the skiving cutter 3 with respect to the workpiece W, and corrects the rotation angle of the skiving cutter 3 with respect to the workpiece W so as to eliminate the rotation angle displacement. In the machine tool 1, even when a rotation angle displacement due to fitting backlash is produced in rough machining, therefore, the machining allowance M that is left on the rough-machined workpiece W can be surely cut away in finish machining which is performed after rough machining. In the machine tool 1, in the case where machining is performed on a plurality of workpieces W under the same conditions, as a result, the machining accuracy of gear machining can be improved while shortening the cycle times in the second and subsequent gear machining.

In the case where a helical gear is to be formed on the workpiece W, the second correction amount calculating section 132 calculates a necessary rotation angle correction amount of the workpiece W or the skiving cutter 3 based on the specifications of the helical gear to be formed, and the separation distance between the skiving cutter 3 and workpiece W that are in the finish machining start positions. Hereinafter, the rotation angle correction amount that is obtained by calculation by the second correction amount calculating section 132 is referred to as "second correction amount β."

The second correction amount calculating section 132 calculates the second correction amount β by using following Expression (1). In Expression (1), L indicates the separation distance between the workpiece W and the skiving cutter 3 in the feeding direction (machining direction) of the skiving cutter 3 in the finish machining start position, a indicates the helix angle of the helical gear to be formed, m indicates the module of the gear to be formed, and z indicates the number of the teeth of the helical gear to be formed.

(Exp. 1)

$$\beta = L \times \sin(a) \times 360/(m \times z \times \pi) \qquad (1)$$

The correction executing section 133 corrects the angle of the skiving cutter 3 with respect to the workpiece W based on the first correction amount α that is calculated by the first correction amount calculating section 131, and the second correction amount β that is calculated by the second correction amount calculating section 132. Specifically, the correction executing section 133 derives the total correction amount (α+β) in which the first correction amount α and the second correction amount β are combined with each other, and the workpiece spindle 24 is rotated in accordance with the derived total correction amount. Even when a rotation angle displacement due to fitting backlash is produced in the state where the skiving cutter 3 is mounted on the tool spindle 35, therefore, the angle correcting section 130 can cause the edge tip of the skiving cutter 3 to be placed in the position corresponding to a tooth space formed in the workpiece W that has been rough machined.

The second correction amount storage section 134 stores the second correction amount β that is calculated by the second correction amount calculating section 132. In the case where gear machining is continuously performed on a plurality of workpieces W under the same machining conditions, when gear machining in the second and subsequent gear machining is to be performed, the angle correcting section 130 derives the total correction amount by using the second correction amount β that is stored in the second correction amount storage section 134. In the machine tool 1, therefore, the calculation by the second correction amount calculating section 132 can be omitted in the second and subsequent gear machining.

The workpiece angle storage section 135 stores, as angle information of the workpiece W, position information of the tooth space in the rotation direction of the workpiece W that is known based on a result of the measurement performed by the workpiece measuring device 80. In the case where gear machining is continuously performed on a plurality of workpieces W under the same machining conditions, when gear machining in the second and subsequent gear machining is to be performed, the angle correcting section 130 uses the angle information of the workpiece W that is stored in the workpiece angle storage section 135.

In regard to this point, the hob cutter 2 is mounted on the tool spindle 35 in the state where the fitting part 47 is fitted to the fitted part 37. Then, the rough machining controlling section 110 sets the workpiece W mounted on the workpiece spindle 24, and the hob cutter 2 mounted on the tool spindle 35 to the rotation start angle, and, in the state where the workpiece W and the hob cutter 2 are placed in the rough machining start positions, starts the relative movement of the hob cutter 2 with respect to the workpiece W. When the rough machining is ended, then, the machine tool 1 replaces the working tool 40 mounted on the tool spindle 35 from the hob cutter 2 to the skiving cutter 3 in the state where the workpiece W remains to be mounted on the workpiece spindle 24. In the case where rough machining is performed on a plurality of workpieces W under the same conditions, therefore, the position of the tooth space formed in each of the workpiece W after rough machining is approximately identical with the position at the setting of the workpiece spindle 24 to the rotation start angle.

In the machine tool 1, in the case where gear machining is continuously performed on a plurality of workpieces W under the same machining conditions, in the initial gear machining, therefore, the position of the tooth space of the workpiece W that has been rough machined is measured by the workpiece measuring device 80 in the state where the rotation angle of the workpiece spindle 24 is set to the rotation start angle. Next, the position information of the tooth space of the rough-machined workpiece W that is obtained by the measurement is stored as the angle information of the workpiece W in the workpiece angle storage section 135. In the machine tool 1, in the second and subsequent gear machining, then, the angle of the skiving cutter 3 with respect to the workpiece W is corrected so that the tooth space of the workpiece W that is stored in the workpiece angle storage section 135, and the edge tip of the skiving cutter 3 are placed in positions corresponding to each other.

In the machine tool 1, therefore, the works of mounting the workpiece measuring device 80 on the tool spindle 35, and measuring the position of the tooth space of the workpiece W can be omitted in the second and subsequent gear machining, and hence the cycle time can be shortened.

Even in the case where gear machining is continuously performed on a plurality of workpieces W under the same machining conditions, in the rotation angle of the hob cutter 2 mounted on the tool spindle 35, a rotation angle displacement due to fitting backlash may be produced within a constant range. Therefore, the position of the tooth space that is formed in the rough-machined workpiece W in the second and subsequent gear machining does not always coincide with the position of the tooth space that is stored in the workpiece angle storage section 135.

In regard to this point, the machine tool 1 performs rough machining while leaving the machining allowance M2 in which a rotation angle displacement due to fitting backlash is considered, and, in finish machining, surely cuts away the machining allowance M2 that is left on the rough-machined workpiece W. Therefore, the teeth that are formed on the finish-machined workpiece W can be formed into a desired shape.

6. Workpiece Machining Process

Referring to the first flowchart and the second flowchart shown in FIGS. 7A and 7B, next, the workpiece machining process that is executed by the controller 100 will be described.

Figure 7A:
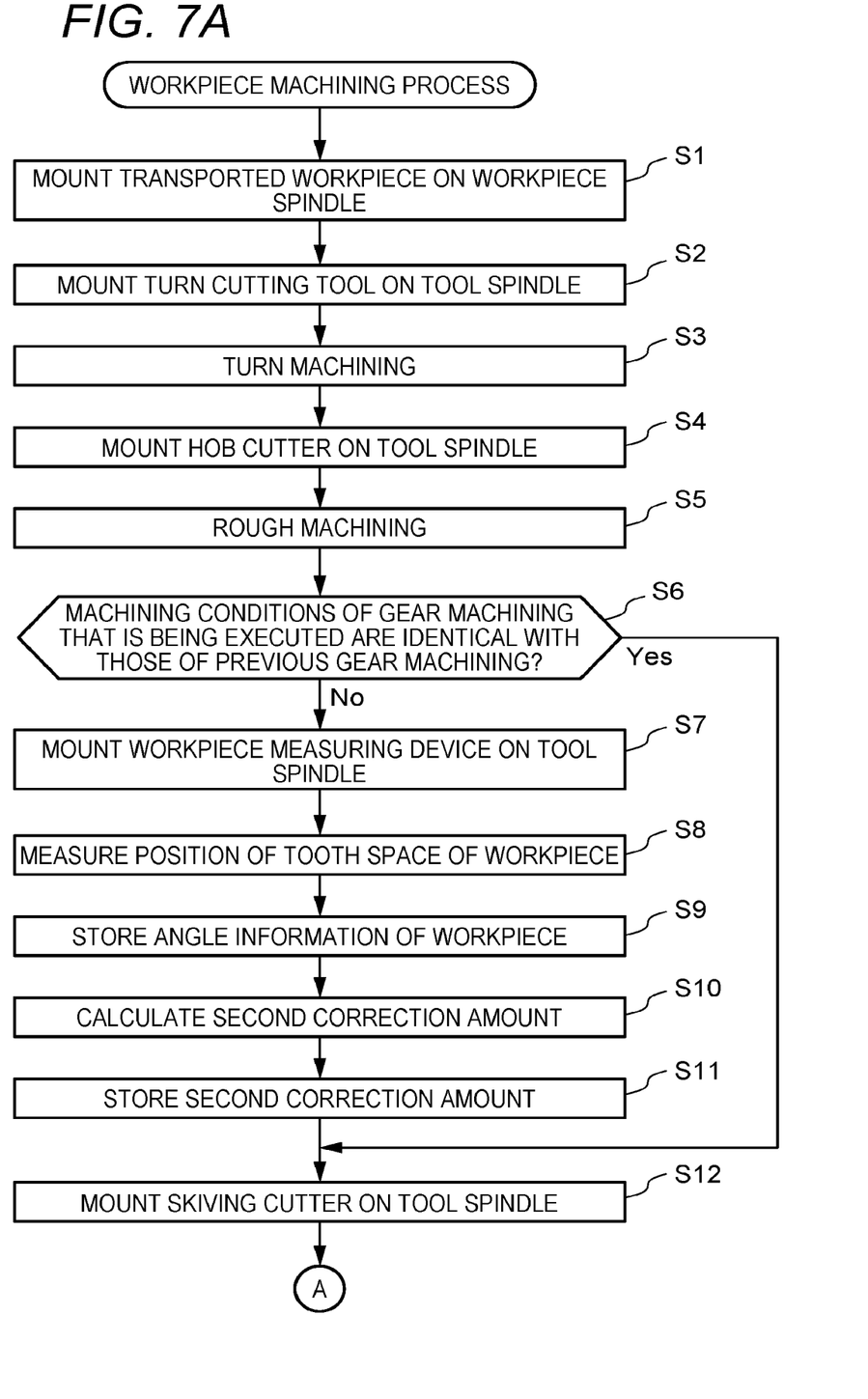
FIG. 7A is a first flowchart showing a workpiece machining process that is executed by the controller.

As the initial process that is executed as the workpiece machining process, as shown in FIG. 7A, the controller 100 causes the transported workpiece W to be mounted on the workpiece spindle 24 (S1: workpiece mounting step). Next, the controller 100 causes the turn cutting tool 4 housed in the tool magazine 50 to be mounted on the tool spindle 35 (S2), and causes the workpiece W to undergo turn machining (S3).

After the process of step S3, the controller 100 causes the turn cutting tool 4 to be dismounted from the tool spindle 35, and the hob cutter 2 housed in the tool magazine 50 to be mounted on the tool spindle 35 (S4: hob cutter mounting step). Then, the rough machining controlling section 110 performs rough machining on the workpiece W (S5: rough machining step). At this time, the machine tool 1 starts rough machining without correcting a rotation angle displacement due to fitting backlash of the hob cutter 2 mounted on the tool spindle 35. In the machine tool 1, therefore, detection of the position of the edge tip of the hob cutter 2, and correction of a rotation angle displacement can be omitted, and hence the cycle time can be shortened.

After the process of step S5, the controller 100 determines whether the machining conditions of the gear machining that is being executed are identical with those of the previous gear machining or not (S6). If it is determined that the machining conditions of the gear machining that is being executed are not identical with those of the previous gear machining (S6: No), the controller 100 causes the hob cutter 2 mounted on the tool spindle 35 to be dismounted therefrom, and the workpiece measuring device 80 housed in the tool magazine 50 to be mounted on the tool spindle 35 (S7).

Then, the controller 100 measures, by using the workpiece measuring device 80, the position of the tooth space that is formed in the rough-machined workpiece W (S8: workpiece measuring step), and causes position information of the tooth space that is obtained by the measurement, to be stored as the angle information of the workpiece W in the workpiece angle storage section 135 (S9: workpiece angle storing step).

Then, the second correction amount calculating section 132 calculates the second correction amount β (S10), and the value of the second correction amount β that is obtained by the calculation is stored in the second correction amount storage section 134 (S11). By contrast, if the machining conditions of the gear machining that is being executed are identical with those of the previous gear machining (S6: Yes), the controller 100 skips the process of steps S7 to S11, and transfers to the process of step S12.

In the process of step S12, the controller 100 causes the hob cutter 2 or workpiece measuring device 80 that is mounted on the tool spindle 35, to be dismounted therefrom, and the skiving cutter 3 housed in the tool magazine 50 to be mounted on the tool spindle 35 (skiving cutter mounting step).

Figure 7B:
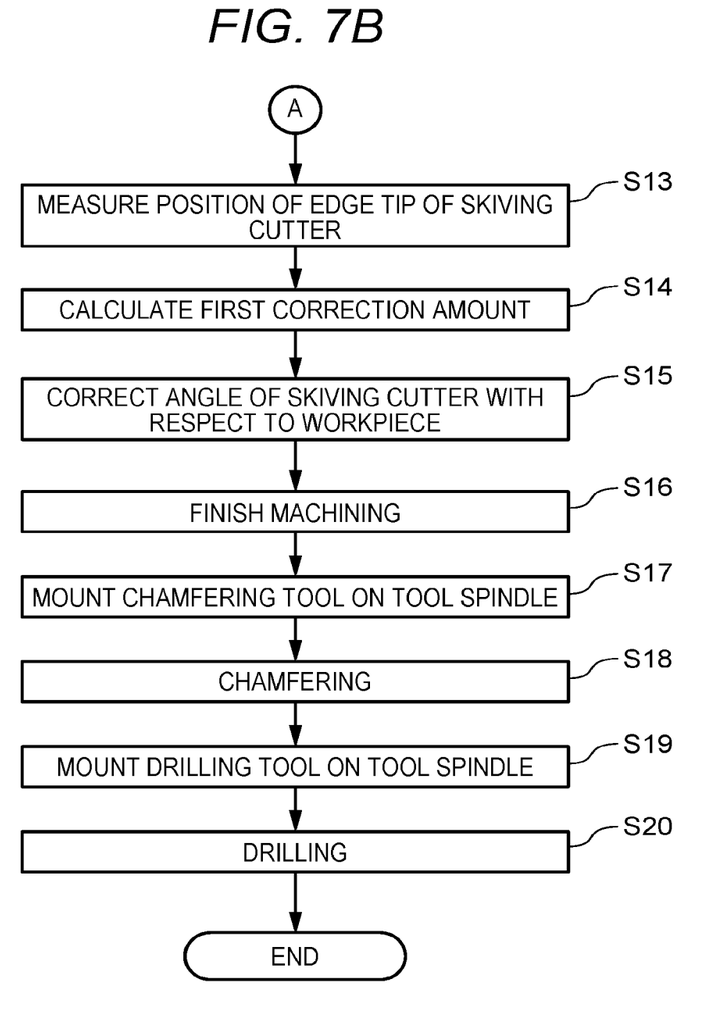
FIG. 7B is a second flowchart showing the workpiece machining process that is executed by the controller.

After the process of step S12, as shown in FIG. 7B, the controller 100 measures, by using the tool measuring device 70, the position of the edge tip of the skiving cutter 3 mounted on the tool spindle 35 (S13: tool measuring step). Then, the first correction amount calculating section 131 calculates the rotation angle displacement amount between the workpiece W and the skiving cutter 3 based on the position of the edge tip of the skiving cutter 3 that is measured by the tool measuring device 70, and that of the tooth space of the workpiece W that is stored in the workpiece angle storage section 135 (S14).

Then, the correction executing section 133 derives the total correction amount based on the first correction amount α calculated by the first correction amount calculating section 131, and the second correction amount β stored in the second correction amount storage section 134, and, in accordance with the derived total correction amount, corrects the angle of the skiving cutter 3 with respect to the workpiece W (S15: angle correcting step). Although, in the embodiment, the angle correcting section 130 corrects the angle of the skiving cutter 3 with respect to the workpiece W by causing the workpiece spindle 24 to rotate, the angle of the skiving cutter 3 with respect to the workpiece W may be corrected by causing the tool spindle 35 to rotate.

After the process of step S15, the finish machining controlling section 120 performs finish machining on the workpiece W (S16: finish machining step). Thereafter, the controller 100 causes the skiving cutter 3 to be dismounted from the tool spindle 35, and the chamfering tool 5 housed in the tool magazine 50 to be mounted on the tool spindle 35 (S17), and performs chamfering (S18). Then, the controller 100 causes the chamfering tool 5 to be dismounted from the tool spindle 35, and the drilling tool 6 housed in the tool magazine 50 to be mounted on the tool spindle 35 (S19), and performs drilling (S20). As a result, the process is ended. Then, the workpiece W in which the workpiece machining process has been ended is taken out by a transferring apparatus that is not shown.

As described above, in gear machining by the machine tool 1, rough machining is performed by using the hob cutter 2, and therefore the time period required to perform the rough machining can be shortened. In rough machining in which the machining allowance is large in the case where the workpiece W is to be cut, namely, the machine tool 1 uses the hob cutter 2, and therefore the cutting amount can be increased while suppressing wear of the working tool 40, as compared with the case where the skiving cutter 3 is used.

By contrast, the machine tool 1 uses the skiving cutter 3 in finish machining in which the machining allowance is small in the case where the workpiece W is to be cut, and therefore accurate machining can be performed as compared with the case where the hob cutter 2 is used. In the machine tool 1, therefore, shortening of the machining time and enhancement of the machining accuracy can be compatible with each other while suppressing the cost of working tools.

In addition, in the finish machining preparation state, the angle correcting section 130 corrects the angle of the skiving cutter 3 with respect to the workpiece W, and the edge tip of the skiving cutter 3 that is mounted on the tool holder 30 is placed in a position corresponding to the tooth space that is formed in the workpiece W that is held by the workpiece holder 20, and that has been rough machined. Therefore, the machine tool 1 can form a gear that is formed after finish machining, into a desired shape.

In the state where the workpiece W remains to be held by the workpiece holder 20, the machine tool 1 continuously performs turn machining, rough machining, finish machining, chamfering, and drilling. Namely, the machine tool 1 continuously performs replacement of the working tool 40 that is mounted on the tool holder 30, and machining by the working tool 40, without dismounting the workpiece W from the workpiece holder 20. In the machine tool 1, therefore, the number of works of mounting and dismounting the workpiece W can be reduced. In the machine tool 1, moreover, the machining processes ranging from turn machining to drilling are performed in the state where the workpiece W remains to be mounted on the workpiece holder 20, and therefore the number of steps of detecting the tooth space formed in the workpiece W can be reduced. In the machine tool 1, consequently, the cycle time can be shortened.

In the machine tool 1, in the case where gear machining is continuously performed on a plurality of workpieces W under the same machining conditions, at the timing that is during the initial gear machining, after the process (rough machining step) of step S5, and before the process (angle correcting step) of step S15, moreover, the process (workpiece measuring step) of step S8 and the process (workpiece angle storing step) of step S9 are executed. In the second and subsequent gear machining, the machine tool 1 omits the processes of steps S8 and S9. In the machine tool 1, therefore, the cycle time can be shortened in the second and subsequent gear machining.

In the machine tool 1, in the case where, during finish machining using a skiving cutter 3, the skiving cutter 3 is broken, the broken skiving cutter 3 must be replaced with a new skiving cutter 3. In regard to this point, in the case where replacement of the skiving cutter 3 is conducted during finish machining, the machine tool 1 performs the measurement by the tool measuring device 70, and the correction by the angle correcting section 130, and thereafter resumes the finish machining by the finish machining controlling section 120. In the machine tool 1, in the case where finish machining is interrupted and replacement of the skiving cutter 3 is conducted, namely, the edge tip of the skiving cutter 3 can be placed in the position corresponding to the tooth space formed in the workpiece W by a procedure that is similar to that which is performed by the angle correcting section 130 in the finish machining preparation state. In the machine tool 1, as a result, the control performed by the controller 100 can be simplified.

7. Others

Although the present disclosure has been described with reference to the embodiment, the present disclosure is not limited to the embodiment, and it can be easily inferred that the embodiment can be variously modified or improved without departing from the spirit of the present disclosure. Although the embodiment in which the machine tool 1 can execute turn machining, rough machining, finish machining, chamfering, and drilling on the workpiece W has been exemplarily described, for example, the machine tool 1 is required to be able to execute at least rough machining and finish machining.

Although the embodiment in which the machine tool 1 performs turning as pre-machining that is performed before rough machining and finish machining has been exemplarily described, machining other than turning may be performed as pre-machining. Although the example in which the machine tool 1 performs chamfering and drilling as post-machining that is performed after rough machining and finish machining has been described, similarly, machining other than chamfering and drilling may be performed as post-machining.

Although the embodiment in which the workpiece measuring device 80 measures the position of the tooth space formed in the workpiece W, and the tool measuring device 70 measures the position of the edge tip formed in the skiving cutter 3 has been exemplarily described, the present disclosure is not limited to this. In the machine tool 1, namely, the workpiece measuring device 80 may measure the position of the tooth tip formed in the workpiece W, and the tool measuring device 70 may measure the position of the gullet formed in the skiving cutter 3.

Although the embodiment in which, in the skiving cutter 3, the to-be-detected part 46 is disposed in the holder portions 42, and the tool measuring device 70 detects the to-be-detected part 46 to measure the position of the edge tip in the rotation direction of the skiving cutter 3 has been exemplarily described, the present disclosure is not limited to this. For example, the tool measuring device 70 may directly detect the edge portion 41 of the skiving cutter 3. In this case, the tool measuring device 70 may perform the sensing of the edge portion 41 that is performed by a sensor, with starting from the radial outer side of the edge portion 41, or in the axial direction of the edge portion 41.

What is claimed is:

1. A machine tool comprising:
    a workpiece holder that is configured to rotatably hold a workpiece;
    a tool holder that is configured to be relatively movable with respect to the workpiece holder while rotatably holding one of a plurality of working tools configured to machine the workpiece, each tool of the plurality of working tools being configured to be attachable to and detachable from the tool holder, and the plurality of working tools including a hob cutter that is to be used in a rough machining of the workpiece and a skiving cutter that is to be used in a finish machining of the workpiece;
    a tool magazine that is configured to house the working tools;
    a tool replacing device that is configured to replace a first working tool, of the plurality of working tools, mounted on the tool holder with a second working tool, of the plurality of working tools, housed in the tool magazine; and
    a controller configured to
        operate the machine tool to perform the rough machining on the workpiece by relatively moving the workpiece and the hob cutter while synchronously rotating the workpiece and the hob cutter, the workpiece being held by the workpiece holder and the hob cutter being mounted on the tool holder;
        receive, from a tool measuring device, a measured position of a blade of the skiving cutter in a rotation direction of the skiving cutter in a finish machining preparation state, the finish machining preparation state being a state in which the workpiece holder and the tool holder are placed in a predetermined finish machining start position, and in which each of the workpiece and the skiving cutter is set at a predetermined rotation start angle;
        cause a correction, in the finish machining preparation state, of a rotation angle of the skiving cutter with respect to the workpiece based on the measured position measured by the tool measuring device, and cause a tooth space formed in the workpiece and an edge tip of the blade of the skiving cutter mounted on the tool holder to be placed in a position corresponding to each other; and
        cause relative movement of the workpiece and the skiving cutter while synchronously rotating the workpiece and the skiving cutter such that the workpiece is finish machined.

2. The machine tool according to claim 1, the machine tool further comprising:
    a workpiece measuring device that is configured to measure a position of a tooth in a rotation direction of the workpiece in a state where the workpiece is set at the predetermined rotation start angle; and
    a workpiece angle storage section that is configured to store a position information of the tooth space in the rotation direction of the workpiece, the position information including an angle information of the workpiece and being acquired based on a result measured by the workpiece measuring device,
    wherein, after the workpiece holder and the tool holder are placed in a predetermined rough machining start position, the controller is configured to cause the machine tool to perform the rough machining,
    wherein the workpiece is a first workpiece,
    wherein the controller is configured to control the workpiece measuring device to measure the first workpiece and store the angle information of the first workpiece in the workpiece angle storage section prior to the finish machining of the first workpiece, and
    wherein the controller is configured to omit measuring a second workpiece with the workpiece measuring device when the second workpiece is machined with a same machining condition as the first workpiece.

3. The machine tool according to claim 1, wherein each of the plurality of working tools includes a respective fitting part that is configured to be fitted to a fitted part provided in the tool holder, and
    wherein the controller is configured to cause correction of a gap between rotation angles of the workpiece and the working tool due to a backlash between the fitted part and the fitting part.

4. The machine tool according to claim 3, wherein the controller is configured to cause the machine tool to perform the rough machining while leaving a machining allowance in which the gap between the rotation angles of the workpiece and the working tool due to the backlash are considered.

5. The machine tool according to claim 1, wherein the controller is configured to
    calculate a first correction amount of the rotation angle of the skiving cutter with respect to the workpiece based on an amount of a gap between the tooth space of the workpiece and the edge tip of the skiving cutter;

calculate a second correction amount of the rotation angle of the skiving cutter with respect to the workpiece when a helical gear is generated on the workpiece, based on specifications of the helical gear and a distance separated between the skiving cutter and the workpiece in the predetermined finish machining start position; and cause a correction of the rotation angle of the skiving cutter with respect to the workpiece based on the first correction amount of the rotation angle of the skiving cutter with respect to the workpiece and based on the second correction amount of the rotation angle of the skiving cutter with respect to the workpiece.

6. The machine tool according to claim 1, the machine tool further comprising at least one of:

a pre-machining tool that is configured to be used in a pre-machining performed before the rough machining, and that is housed in the tool magazine; and a post-machining tool that is configured to be used in a post-machining performed after the finish machining, and that is housed in the tool magazine.

7. The machine tool according to claim 1, wherein, in a case where the skiving cutter is replaced with an alternative skiving cutter, the controller is configured to cause the tool measuring device to perform measuring of the alternative skiving cutter, and to cause correcting of a gap between the rotation angle of the workpiece and a rotation angle of the alternative skiving cutter.

8. The machine tool according to claim 1, wherein, in a state where the workpiece is held by the workpiece holder, the controller is configured to operate the machine tool to perform replacing of the first working tool, of the plurality of working tools, that is mounted on the tool holder, with the second working tool of the plurality of working tools, and to perform machining of the workpiece with the second working tool.

* * * * *